United States Patent [19]

Atherton et al.

[11] 4,252,718

[45] Feb. 24, 1981

[54] CONTINUOUS AZO COUPLING PROCESS

[75] Inventors: John H. Atherton; Ian Hodgkinson, both of Manchester, England

[73] Assignee: Imperial Chemical Industries Limited, London, England

[21] Appl. No.: 11,049

[22] Filed: Feb. 9, 1979

[30] Foreign Application Priority Data

Feb. 14, 1978 [GB] United Kingdom ............ 05818/78

[51] Int. Cl.³ ................ C09B 35/00; C09B 35/26; C09B 35/36; C09B 41/00
[52] U.S. Cl. ............................ 260/207; 210/650; 260/144; 260/152; 260/155; 260/156; 260/157; 260/158; 260/162; 260/163; 260/193; 260/205; 260/206; 260/207.1; 260/208
[58] Field of Search ............. 260/144 P, 152, 155, 260/156, 157, 158, 162, 163, 176, 178, 186, 187, 191, 192, 193, 205, 206, 207, 207.1

[56] References Cited

U.S. PATENT DOCUMENTS

| 2,478,767 | 8/1949 | Locke | 260/144 P |
|---|---|---|---|
| 3,423,391 | 1/1969 | Windler et al. | 260/141 |
| 3,793,305 | 2/1974 | Balon | 260/154 |
| 4,018,751 | 4/1977 | Trecek | 260/205 |
| 4,159,264 | 6/1979 | Hamilton et al. | 260/155 |

FOREIGN PATENT DOCUMENTS

| 572950 | 3/1959 | Canada | 260/144 |
|---|---|---|---|
| 77985 | 12/1970 | German Democratic Rep. | 260/144 P |
| 1934388 | 3/1971 | Fed. Rep. of Germany | 260/14 |
| 360357 | 11/1972 | U.S.S.R. | 260/205 |

OTHER PUBLICATIONS

Naraten, Chimia, vol. 15, pp. 156 et seq. (1961).

*Primary Examiner*—Floyd D. Higel
*Attorney, Agent, or Firm*—Cushman, Darby & Cushman

[57] ABSTRACT

A process for the preparation of an aqueous slurry of a water-insoluble azo compound which comprises continuously mixing together, in a reaction zone from which the slurry is continuously removed, a first stream containing a diazonium compound resulting from the diazotization of a heterocyclic or weakly basic benzenoid amine in an acid medium, hereinafter referred to as the diazo component, and a second stream containing a compound capable of coupling with the diazo component under the conditions existing in the reaction zone to form a water-insoluble azo compound hereinafter referred to as the coupling component.

7 Claims, 1 Drawing Figure

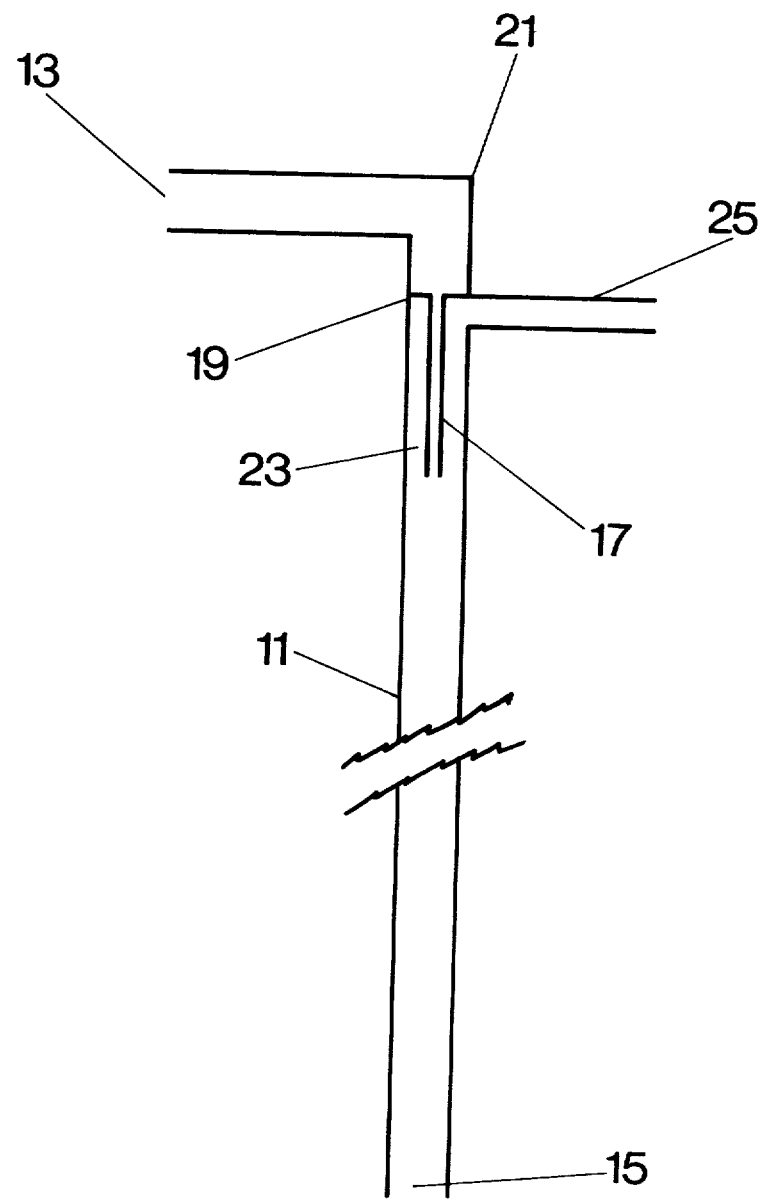

CONTINUOUS AZO COUPLING PROCESS

This invention relates to a process for the preparation of an aqueous slurry of a water-insoluble azo compound and in particular to such a process performed in a continuous manner.

According to the present invention we provide a process for the preparation of an aqueous slurry of a water-insoluble azo compound which comprises continuously mixing together, in a reaction zone from which the slurry is continuously removed, a first stream containing a diazonium compound resulting from the diazotisation of heterocyclic or weakly basic benzenoid amine in an acid medium, hereinafter referred to as the diazo component, and a second stream containing a compound capable of coupling with the diazo component under the conditions existing in the reaction zone to form a water-insoluble azo compound hereinafter referred to as the coupling component.

By continuously is meant that the diazo and coupling components are mixed together at substantially equivalent rates, with preferably a slight excess of the coupling component, so that by the time the slurry leaves the reaction zone mixing and reaction are substantially complete and there is little or no excess or either component in the slurry over and above any predetermined excess added to one of the streams.

The coupling reaction is preferably carried out under such conditions that the streams are mixed together completely and intimately, in one or more stages, in a time sufficiently short to ensure a high degree of selectivity of the reaction producing the desired azo compound and in particular to minimise decomposition of the diazo component.

Where a product is not in the same phase as the reactants from which it is formed, particularly where a solid product is produced by mixing two solutions, there is the possibility of incomplete reaction, should unreacted material become occluded within the product or floccules of the product. The mixing should, therefore, preferably be of such an intensity as to avoid such occlusion. Intense mixing also promotes the formation of a product having a smaller and more uniform particle size distribution.

Heterocyclic and weakly basic benzenoid amines are conventionally diazotised in a concentrated sulphuric acid medium, i.e. a medium comprising at least 50% by weight of sulphuric acid based on the total weight of water and sulphuric acid in the medium and the first stream may comprise the direct product of such a diazotisation process.

The acid medium is therefore conveniently a sulphuric acid medium containing at least 50% by weight of sulphuric acid based on the total weight of water and sulphuric acid therein although it may contain other acids such as acetic or phosphoric acid.

Some of the less weakly basic benzenoid amines, e.g. 2,4-dinitroaniline and the halomononitroanilines, may however be diazotised under more dilute acid conditions and the product of such a process containing the diazo compound in a more dilute acid medium comprising as little as 25% by weight of sulphuric acid may form the first stream.

The minimum concentration of acid in the first stream is preferably such that the diazonium compound undergoes less than 5%, and more preferably less than 1%, decomposition before it is mixed with the second stream. In linked continuous diazotisation and coupling systems the extent of such decomposition and thus the minimum acid concentration that can be tolerated is dependent, in part, on the time period between diazotisation and coupling. If the acid concentration in the product stream at the end of the diazotisation is such that the diazonium compound is not stable therein, decomposition of the diazonium compound may be kept within the above-mentioned preferred limits by an appropriate reduction in the time period between diazotisation and coupling.

To achieve coupling under suitable conditions, a highly agitated small vessel equipped with means for supplying metered feeds of both component streams may be used. Alternatively a tubular mixer, wherein the tube geometry and fluid velocities employed are such as to promote good mixing, may be used. By tubular mixer is meant any any device in which the reactants are contrained in tubes or jets and brought together for rapid and thorough mixing, the combined reactant stream issuing from an outlet tube or pipe within which the reaction is substantially completed.

Alternatively the reaction zone may comprise a recirculation system having at least one mixing zone in which the reactants are mixed, a recirculation loop connecting an inlet into the mixing zone or zones and an outlet therefrom and means for circulating the reaction mixture through the loop. The product stream is conveniently removed from the reaction zone through an outlet from the recirculation loop.

Where the reaction zone is contained in an agitated vessel the agitator is desirably of the high shear type, e.g. those sold under the trade names Turrax and Silverson, so that the reactants are subjected to high shear during mixing and reaction and the formation of floccules of the azo compound, which may contain occluded reactants, is minimised.

It is not essential however that there should be any attrition or grinding of the particles of the product because the rapid and intimate mixing in a relatively small reaction zone is normally sufficient to ensure the formation of the product in a finely divided state. The presence of a surfactant in the reaction zone during coupling may help to maintain the product in a finely divided state by inhibiting flocculation of the primary particles.

A tubular mixer may comprise for example as T-junction or Y-junction of pipes, a concentric arrangement of tubes, a multi-jet cluster or a tangential jet mixer. In the case of a T-junction it is preferred that the reactants approach each other along opposed arms of the T and that the reaction mixture is removed at right angles to the direction of approach.

Mixing may be enhanced by the presence of a static mixer, for example a set of baffles such as are supplied under the trade names Kenics and Sulzer, in the reaction zone which extends along the tube through which the reaction mixture is removed from mixer.

Where the first stream is a concentrated sulphuric acid medium ($\geq 50\%$) it can be rather viscous and, in order to facilitate mixing with the second stream, it may be converted to a more dilute medium by mixing the direct product of the diazotisation process, as hereinbefore described, with water, immediately prior to mixing it with the second stream. Such mixing with water is hereinafter referred to as predilution and is preferably effected in a mixing zone immediately upstream of the coupling reaction zone.

The extent of predilution is preferably such that the concentration of acid in the first stream is reduced to within the range 2% to 15% and more preferably 5% to 10% by weight with respect to the total weight of water and acid in the stream so that the viscosity of the first steam may be reduced. Such a prediluted stream usually mixes more readily and efficiently with the second stream.

Another advantage of predilution is that the diluted first stream contains the less stable of the two reactants and, even though the second stream may be somewhat viscous, there is a reduced tendency for the development of isolated pockets of the diazo component and therefore more efficient coupling.

As the diazo component is normally unstable in such dilute acid conditions it is preferred that predilution of the first stream is effected as late as possible before mixing with the second stream, and within a time period sufficient to minimise decomposition of the diazo component. Such a time period is typically in the range 1 second to 1 millisecond.

The predilution may also be performed with advantage in a tubular reactor, optionally fitted with a static mixer, in this case the difference in viscosity between the water and concentrated acid not being so critical because there is little or no tendency for formation of isolated pockets of unstable diluted diazo component which could lead to decomposition of the diazo component.

Suitable coupling components are those which can be coupled with the diazonium salts of heterocyclic or weakly basic benzenoid amines to give products of the disperse dye and pigment types.

If the derived azo compound is represented by the structure

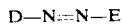

where D is the residue of the diazo component then the residue of the coupling component represented by E can be the residue of any of the series of coupling components which couple with such diazo components, for example the residues of a coupling component from the acylacetarylamide, pyrazolone, aminopyrazolone, phenol, naphthol, 2,6-diaminopyridine or 2,6-dihydroxypyridine series. More especially E is the residue of an aromatic coupling component which couples by virtue of the presence of an optionally substituted amino group, such as the residue of a coupling component of the 1-naphthylamine series, and more particularly the residue of a coupling component of the aniline series which couples in the para position relative to an optionally substituted amino group.

The residue of the coupling component represented by E is preferably of the formula:

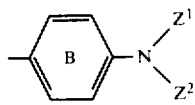

wherein $Z^1$ and $Z^2$ each independently represent a hydrogen atom or an optionally substituted hydrocarbon radical, especially an optionally substituted lower alkyl radical, or may together form a cyclic structure including the nitrogen atom attached to ring B, and the benzene ring B can contain additional substituents or form part of an optionally further substituted naphthalene or quinoline ring.

E especially represents a radical of the formula:

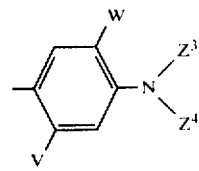

wherein W is hydrogen, lower alkyl or lower alkoxy, V is hydrogen, lower alkyl, lower alkoxy, chlorine, bromine or acylamino, in particular an acylamino group of the formula $—NHCOT^2$ or $—NHSO_2T^3$, wherein $T^2$ is hydrogen, alkyl especially lower alkyl, aryl, amino or aminoalkyl, $T^3$ is optionally substituted lower alkyl or aryl, $Z^3$ is hydrogen or an optionally substituted alkyl especially lower alkyl radical, and $Z^4$ is hydrogen or an optionally substituted alkyl especially lower alkyl, or optionally substituted aryl or cycloalkyl, or $Z^3$ and $Z^4$ may together form a cyclic structure.

As examples of the optionally substituted lower alkyl radicals represented by $Z^1$, $Z^2$, $Z^3$ and $Z^4$ there may be mentioned hydroxy lower alkyl such as β-hydroxyethyl, α-methyl-β-hydroxyethyl, β- or γ-hydroxypropyl, and δ-hydroxybutyl, lower alkoxy lower alkyl such as β-(methoxy or ethoxy)ethyl and γ-methoxypropyl, cyano lower alkyl such as β-cyanoethyl, phenyl lower alkyl such as benzyl and β-phenylethyl, acyloxy lower alkyl such as β-acetoxyethyl and 1-acetoxy-2-propyl, carboxy lower alkyl such as β-carboxyethyl and δ-carboxybutyl, lower alkoxy carbonyl lower alkyl such as β-methoxycarbonylethyl, hydroxy lower alkoxy lower alkyl such as β-(β'-hydroxyethoxy)ethyl, lower alkoxy lower alkoxy lower alkyl such as β-(β'-methoxyethoxy)ethyl, lower alkoxy lower alkoxycarbonyl lower alkyl such as β-(β'-methoxyethoxycarbonyl)ethyl, acyloxy lower alkyl in particular lower alkylcarbonyloxy lower alkyl such as β-acetoxyethyl and δ-acetoxybutyl, chloro lower alkyl such as γ-chloropropyl, and lower alkoxycarbonyloxy lower alkyl such as β-ethoxycarbonyloxethyl or, where $Z^1$ and $Z^2$ or $Z^3$ and $Z^4$ form a cyclic structure, the groups $—NZ^1Z^2$ or $—NZ^3Z^4$ may be morpholine, piperidine or pyrrolidine groups.

As examples of the said coupling components there may be mentioned acylacetarylamides such as acetoacetanilide and acetoacet-2,5-dimethoxyanilide, aminopyrazoles such as 1-phenyl-3-methyl-5-aminopyrazole; pyrazolones such as 1,3-dimethyl-5-pyrazolone, but more particularly 1-phenyl-3-(methyl, carbonamido or carbomethoxy)-5-pyrazolones in which the phenyl radical is optionally substituted by for example methyl, methoxy, ethoxy, chlorine, bromine, nitro, sulphonamido or acetylamino; 2,6-dihydroxypyridines such as 3-cyano-4-methyl-2,6-dihydroxypyridine and 1-ethyl-3-cyano-4-methyl-6-hydroxypyrid-2-one; 2,6-diaminopyridines such as 3-cyano-4-methyl-2,6-di(N-2-methoxyethylamino)pyridine; phenols such as o-cresol, resorcinol and 3-acetylaminophenol; naphthols such as β-naphthol; but more especially arylamines of the naphthylamine series such as 1-naphthylamine, and more particularly of the aniline series such as 2,5-dimethoxyaniline, N,N-diethylaniline, N,N-di(β-hydroxyethyl)-m-toluidine, N,N-di(β-cyanoethyl)aniline, N-ethyl-N-(β-ethoxyethyl)aniline, N,N-di-(β-carbomethoxyethyl)- m-toluidine, 2-methoxy-5-methyl-N-(β-acetoxy-α-methylethyl)aniline, N-(β-(β'-methoxyethoxycarbonyl)ethylaniline, N,N-di (β-acetoxyethyl)-m-toluidine, N-ethyl-N-(β-cyanoethyl)aniline N-ethyl-N-(δ-acetoxybutyl)-aniline, N-ethyl-N-benzyl-m-toluidine, N,N-diethyl-m-acetamidoaniline, 2-methoxy-5-acetylamino-N-(2-methoxyethoxycarbonylethyl)aniline, 2-methoxy-5-acetylamino-N,N-bis-(2-methoxycarbonylethyl)aniline, 2-methoxy-5-acetylamino-N-ethyl-N-(2-methoxyethoxycarbonylethyl)aniline, 2-methoxy-5-acetylamino-N,N-bis-(2-acetoxyethyl)aniline, 2-ethoxy-5-acetylamino-N,N-bis-(2-acetoxyethyl)aniline.

A convenient index for the basicity of an amine is the pKa value which is discussed in an article by Johnson et al entitled "The temperature variation of the $H_O$ acidity function in aqueous sulphuric acid solution" (JACS 91 1969 pages 6654–6662). The pKa value of a base is defined as $$pKa = pH + \log \frac{[B]}{[BH^+]} - \log \left[ \frac{f_B f_{H^+}}{f_{BH^+}} \right]$$

wherein $f_B$, $f_{H^+}$ and $f_{BH^+}$ are the activity coefficients of the base, hydrogen ion and conjugate acid respectively.

Preferred benzenoid amines for preparing the diazo components used in the present invention have pKa values in the range $-1.5$ to $-10.5$ and more preferably in the range $-2.5$ to $-7.0$.

Particularly suitable amines from the benzene series contain either at least two nuclear substituents selected from nitro and cyano or at least one nuclear substituent selected from nitro and cyano and at least two further substituents selected from halogen and sulphone. Examples of such amines in the benzene series are 2,4-dinitroaniline, 2-chloro-4,6-dinitroaniline, 2-bromo-4,6-dinitroaniline, 2-cyano-4,6-dinitroaniline, 1-amino-2,4-dinitrobenzene-6-methylsulphone, 2,6-dicyano-4-nitroaniline, 2-cyano-4-nitroaniline, 2-chloro-4-nitro-6-cyanoaniline, 2-bromo-4-nitro-6-cyanoaniline, 2-cyano-4-nitro-6-methylaniline, 2-bromo-6-chloro-4-nitroaniline, and 2,6-dichloro-4-nitroaniline.

It is especially preferred that the benzenoid amines contain at least two nuclear substituents selected from nitro and cyano, and in addition one other substituent selected from nitro, halogen or sulphone groups.

Heterocyclic amines may be derived from imidazoles, thiazoles, triazoles, pyridines, pyrazoles, benzthiazoles, thiadiazoles, thiophenes, isothiazoles, benzisothiazoles or benztriazoles.

Examples of heterocyclic amines are 2-aminothiazole, 2-amino-5-nitrothiazole, 2-amino-5-methylsulphonylthiazole, 2-amino-5-cyanothiazole, 2-amino-4-methyl-5-nitrothiazole, 2-amino-4-methylthiazole, 2-amino-4-phenylthiazole, 2-amino-4-(4'-chlorophenyl)thiazole, 2-amino-4-(4'-nitrophenyl)thiazole, 3-aminopyridine, 3-aminoquinoline, 3-aminopyrazole, 5-amino-1-phenylpyrazole, 3-aminoindazole, 3-amino-2-methyl-5,7-dinitroindazole, 3-amino-1,2,4-triazole, 5-(methyl-, ethyl-, phenyl- or benzyl)-1,2,4-triazole, 3-amino-1-(4'-methoxyphenyl)pyrazole, 2-aminobenzthiazole, 2-amino-6-methylbenzthiazole, 2-amino-6-methoxybenzthiazole, 2-amino-6-cyanobenzthiazole, 2-amino-6-nitrobenzthiazole, 2-amino-6-carboethoxybenzthiazole, 2-amino-6-thiocyanatobenzthiazole, 2-amino-6-methylsulphonylbenzthiazole, 2-amino-1,3,4-thiadiazole, 2-amino-1,3,5-thiadiazole, 2-amino-4-phenyl- or 4-methyl-1,3,5-thiadiazole, 2-amino-5-phenyl-1,3,4-thiadiazole, 2-amino-3-nitro-5-methylsulphonyl thiophene, 2-amino-3,5-dinitrothiophene, 2-amino-3-alkoxycarbonyl-5-nitrothiophene (where alkoxy=$C_1$–$C_5$), 2-amino-3-cyano-5-nitrothiophene, 5-amino-3-methyl-4-nitroisothiazole, 3-amino-5-nitro-2,1-benzisothiazole, 3-amino-7-bromo-5-nitro-2,1-benzisothiazole, 5-amino-4-nitro-1-methylimidazole, 4-amino-5-bromo-7-nitrobenzisothiazole and 4-amino-7-nitrobenztriazole.

Preferred heterocyclic amines are from the benzthiazole, triazole and thiophene classes, in particular 2-amino-6-methoxybenzthiazole, 2-amino-6-thiocyanatobenzthiazole, 3-amino-1,2,4-triazole and 2-amino-3,5-dinitrothiophene.

The physical form of the azo compound can be often modified by performing the coupling reaction in the presence of a surfactant which may be introduced in either or both of the first and second streams or in a third stream which enters the reaction zone simultaneously with the other two streams, although it is preferred to introduce the surfactant together with the coupling component in the second stream.

The surfactant may be anionic, cationic or nonionic depending on the nature of the azo compound and the modification which it is desired to make to the crystal form or habit of the azo compound. The presence of a surfactant also helps to prevent contamination of the product surface by tars etc or build up of the azo compound on the walls of the reactor containing the reaction zone.

The ratio of surfactant to azo compound, present during the coupling reaction, in the case of the anionic types may be varied over a wide range, for example from 0.01:1 to 0.5:1. It is preferred however that the proportions used are at the lower end of the above quoted range, i.e. from 0.02:1 to 0.15:1, any additional surfactant required, in order to maintain fluidity of the slurry during and after a concentration process or to inhibit reflocculation after attrition, being added to the slurry after it has left the reaction zone.

As cationic surfactants are not normally compatible with the anionic dispersing agents used in the formulation of disperse dyestuffs, smaller proportions of such surfactants are preferably used, i.e. from 0.01:1 to 0.5:1.

Cationic surfactants are particularly useful in protecting the walls of the reaction zone from build-up of the newly formed azo compound because of their detergent properties.

Larger or smaller quantities than the above quoted proportions may be used but in general do not give a commensurate technical effect nor an acceptable economic advantage.

Suitable surfactants are those disclosed in UK Patent Specification No. 1,425,237 as dispersing or wetting agents. In addition to these there may be mentioned, as nonionic surfactants, water soluble polymers, for example, modified starches such as are described in "Water Soluble Resins" by Davidson and Sittig (Reinhold), methyl and hydroxy propylmethyl cellulose derivatives, hydroxy ethyl cellulose, carboxymethylcellulose, polyvinylalcohol, polyvinyl pyrrolidone, poly(acrylic acid) and its homologues, polyacrylamide, ethylene oxide polymers (Polyox water-soluble resins), polyethylenimine, hydrolysed styrene-maleic anhydride copolymers and poloxamines having the general formula:

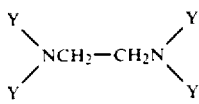

wherein Y is

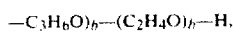

and sulphated derivatives thereof, which are sold under the trade mark "Tetronic" and, as cationic surfactants, quaternary alkylammonium halides in which at least one of the alkyl chains contains from 12 to 25 carbon atoms.

Preferred anionic surfactants are alkyl sulphonates, lignin sulphonates and the condensation products of naphthalene and/or benzene sulphonic acids with formaldehyde. Preferred nonionic surfactants are the ethylene oxide condensates of alkylphenols particularly nonylphenol and of long chain alkanols particularly those having chains of from 12 to 25 carbon atoms and particularly those alkyl phenol and alkanol condensates containing from 5 to 50 ethylene oxide units and polyglyceryl esters of long chain fatty acids e.g. polyglyceryl ricinoleate. Preferred cationic surfactants are the quaternary alkyl ammonium halides containing at least one long chain alkyl group having from 12 to 25 carbon atoms and long chain alkyl pyridinium halides.

If the end use of the azo compound requires that this should be in a more finely divided state than can be achieved during the coupling reaction then the process of the invention may be followed by a grinding or attrition treatment in, for example, a bead or ball mill in order to reduce the particles to the desired size. It has however been found that less attrition or grinding is required in order to achieve a satisfactory dispersion for most end uses than when the azo compound is prepared by known batch coupling processes.

The formation of the azo compound in a moving stream especially in the presence of a surfactant, appears to enhace the production of small stable particles. This means that it is often possible to dispense with the heat treatments and isolation techniques frequently required with azo compounds of the present type when formed in batch coupling processes.

The use of ultrasonic vibrators either on the walls of the reaction zone or in contact with the reaction medium itself can also be beneficial in reducing the tendency for build up of freshly formed product on the wall and in enhancing the formation of the azo compound in a finely divided state.

Further advantages of the continuous coupling reaction are the higher yield and greater purity of product that can be achieved due, it is thought, to the rapid and intimate mixing of the reactants in a relatively confined space. Because of the rapid mixing and reaction of the reactants and the short residence time in the reaction zone, it is generally unnecessary to cool the reaction zone, and thus the use of ice, or other in situ cooling means such as are normally required in batch processes can be avoided.

Where the coupling reaction is slow under acid conditions it is preferable to raise the pH in the reaction zone so that the selectivity and/or the rate of the reaction is optimised. The pH can be raised to any desired value by the addition of an appropriate basic substance to the reaction zone either simultaneously with the first and second streams or shortly thereafter so that the reaction between the diazo and coupling components is effected in a medium at the optimum pH. The basic substance is conveniently an alkaline buffer.

Although the diazo component is generally unstable in dilute acid media it is even more prone to decomposition under alkaline conditions and it is therefore preferable to intimately mix together the diazo and coupling components before raising the pH.

Even where it is not necessary to raise the pH in the reaction zone in order to promote coupling, it is frequently desirable to carry out further processing of the slurry of the azo compound, e.g. concentration, isolation or grinding, in a substantially neutral medium. It may therefore be desirable to raise the pH of the slurry to within the range pH 5 to 9, more preferably 6 to 8, by the addition of a basic substance, e.g. sodium hydroxide, after reaction is complete.

The addition of the basic substance is preferably controlled by means of a pH sensitive probe, in the product stream, which monitors the pH of the medium after neutralisation and controls the rate of addition of the basic substance so as to maintain the pH at or close to a desired value.

Although temperature control is of less critical importance in the case of continuous coupling especially under turbulent conditions, it is nevertheless advantageous to avoid high temperatures in the reaction zone. Depending on the nature of the diazo component, the rate of decomposition can exceed the rate of mixing and coupling if the temperature rises too high. It is therefore preferable, particularly with the less stable diazo components, to pre-cool the reactant streams before they are mixed. This is preferable to cooling the reaction zone because the coupling reaction is often so fast that the heat of reaction cannot be removed fast enough to prevent an excessive rise in temperature. It is generally preferred that the temperature in the reaction zone does not exceed 55° C. and more preferably 40° C. and the degree of pre-cooling may be adjusted accordingly to take account of the heat of reaction, the flow rates of the streams and the heat capacity of the system.

The concentration of the reactant and product streams is generally limited by the physical characteristics of the product stream. At product concentrations above 10% the product stream can be rather thick and tends to inhibit good mixing in the reaction zone. This in turn can promote deleterious side reactions such as diazo decomposition. It is preferred therefore that the concentrations of the reactant streams are adjusted so as to provide a sufficiently fluid product stream to minimise deleterious side reactions. The introduction of dispersing agents into the reaction zone often enhances the fluidity of the product stream and in some cases it is possible to achieve product concentrations up to 20% depending on the nature of the product and the dispersing agent or agents used. As it is commercially and technically desirable to prepare concentrated slurries containing up to 50% or more of the azo compound the coupling is preferably followed by a concentration process.

A preferred concentration process is one which does not adversely affect the physical form of the azo compound especially if this is in a desirable condition and a suitable process for this purpose is a membrane separation treatment. Although conventional isolation and washing techniques using for example filter presses can be applied, they are generally less economically attractive than continuously operable concentration techniques such as membrane separation.

By the term "membrane separation" is meant ultrafiltration, electrodialysis, reverse osmosis or a combination of any or all three of these techniques. Ultrafiltration refers to a treatment in which low molecular weight matter in solution can be separated from insoluble and high molecular weight matter by passing the dispersion over a semi-permeable membrane which, on account of its pore size, allows only the passage of molecules at or below a so-called "cut-off" level, usually expressed in terms of the molecular weight of the largest molecule capable of permeating the membrane. Naturally the smaller the molecule the more easily and rapidly it will permeate the membrane. Where it is desired to remove inorganic matter, e.g. salts and water, from a dispersion containing complex or polymeric organic matter, e.g. surfactants which it is desired to retain, a compromise must normally be accepted between a rapid rate of removal of the inorganic matter and the prevention of any loss of organic matter.

Depending on the molecular weight of the organic matter it is desired to retain cut-off levels in the range 1,000 to 120,000 may conveniently be employed although membranes with cut-off levels in the range 1,000 to 50,000 are preferred.

Where the molecular weight of the organic matter is in the range 500 to 2,500 it has often been found that satisfactory separation can be achieved by the use of a membrane with a cut-off level in the range 50,000 to 20,000 particularly where the organic matter is a nonionic surfactant. Even with low molecular weight anionic and cationic surfactants a membrane with a cut-off in the range 5,000 to 50,000 can often be used to effect satisfactory separation.

This can arise because surfactant materials, and particularly nonionic surfactants, often form micelle structures, loose aggregates containing a few or many molecules, with considerably greater quasi molecular weights than the mono-disperse species. It may also arise to some extent by reason of the chemical characteristics of the organic matter and the membrane, i.e. the relative shapes of the organic molecule and the pores of the membrane and mutual attraction between the organic material and the membrane. These factors can cause the membrane to be less permeable to the organic matter than is indicated by the nominal molecular cut-off level of the membrane and the true molecular weight of the organic matter.

The choice of membrane is normally determined by the ratio of the rate of permeation of the membrane by the matter it is desired to remove from the dispersion to the rate of permeation of the membrane by the matter it is desired to retain in the dispersion. It is preferred that this ratio is at least 5 to 1.

For reasons of economy it is preferred that the membrane is chosen so that the concentration of surfactant in the permeate is less than 50% of that in the concentrated dispersion.

Reverse osmosis refers to a membrane separation process wherein the membrane has pores sufficiently small to restrict the passage of low molecular weight species. As a consequence of this an osmotic pressure is developed across the membrane which must be overcome by an applied pressure before permeation proceeds. In other respects is is similar to ultrafiltration.

Electrodialysis refers to the passage of ionic species through selective membranes under the influence of an electric field applied across the membranes. Such a treatment will not however remove significant quantities of water from the dispersion, so that where it is desired to concentrate the dispersion, in addition to removing inorganic ionic species, it will be necessary to use ultrafiltration also. Where ultrafiltration alone is employed it is often necessary to add water to the slurry in order to prevent the total solids in the concentrate rising too high before all the inorganic species have been removed. Electrodialysis can assist the concentration process by favouring the removal of inorganic ionic species.

Where the inorganic content of the dispersion is particularly high, or the end use of the azo compound requires a particularly low level of inorganic matter, it may be necessary to add water during the membrane separation treatment so as to maintain an adequate fluidity. It will be appreciated that a certain portion of the soluble organic matter, normally surfactant where this is used at the coupling stage, will be lost during ultrafiltration. Such loss can be made up by addition of extra surfactant before, during and after the ultrafiltration treatment depending on the nature of the surfactant of the dispersion.

The invention is illustrated by the following examples in which the percentages are by weight unless otherwise indicated.

EXAMPLE 1

In this example the azo dyestuff is made by coupling diazotised 2-bromo-4,6-dinitroaniline with 2-methoxy-5-acetylamino-N-(2-methoxyethoxycarbonylethyl)aniline. The diazo component is soluble in concentrated sulphuric acid and is prepared by mixing a solution of the amine in 95% sulphuric acid with a solution of nitrosyl sulphuric acid in 100% sulphuric acid. The resultant diazo solution is stable at 20° C. and contains 0.8665 g.mol of diazonium salt per kilogram of solution. The coupling component is soluble in acetic acid/water and a solution is prepared containing 0.120 g.mol of coupling component per liter of 3.7% acetic acid/water.

The diazonium salt solution is fed uniformly at a rate of 166 gm/min to one limb of a pipe junction in the form of a T-piece of 2 mm internal diameter in all limbs. Water is simultaneously fed to another limb at a rate of 1100 ml/min, the solutions meeting at 90°. The mixed solutions pass 10 cm along the exit tube to a second T-junction. Both inlet limbs of this junction are of 2 mm i.d. and the exit limb, which is at 90° to the inlet, is 25 cm long and 3 mm i.d. The solution of coupling component is fed at a uniform rate of 1200 ml/min to the other inlet limb of the second T-piece, and meets the diazo solution at 180°. Coupling is so rapid that no unreacted diazonium salt can be detected in the solution emerging from the exit tube. The flows are arranged such that there is either a molar balance of reactants or fairly small (<5%) excess of the coupling component. Dyestuff slurry leaving the tubular reactor is led to a stirred tank wherein it is continuously neutralised to a pH of 4.5 using an aqueous soltuion of sodium hydroxide. The dyestuff slurry emerging from the neutralisation reactor contains 2.8% colour and approximately 5.1% inorganic salts. Workup of the dyestuff slurry may be by conventional means i.e. filtration and washing free from salt, or alternatively the slurry may be concentrated and washed by ultrafiltration.

EXAMPLE 2

In this example the azo dyestuff is also made by coupling diazotised 2-bromo-4,6-dinitroaniline with 2-methoxy-5-acetylamino-N-(2-methoxyethoxycarbonylethyl)aniline. The diazo component is soluble in concentrated sulphuric acid and is prepared by mixing a solution of the amine in 95% sulphuric acid with a solution of nitrosyl sulphuric acid in 100% sulphuric acid. The resultant diazo solution is stable at 20° C. and contains 0.8665 gm.mol of diazonium salt per kilo of solution. The coupling component is soluble in acetic acid/water and a solution is prepared containing 0.120 gm.mol of coupling component per liter of 3.7% acetic acid/water.

The diazonium salt and coupling component solutions are fed uniformly at rates of 166 gms/min and 2310 ml/min. to a reactor fitted with a Silverson immersion agitator, (Silverson is a registered trade name), by means of pipes which terminate immediately below the rotor of the mixer. The mean residence time within the reactor is 6 seconds. The rotor has a diameter of 3 cm. and is rotated at 8,000 r.p.m. Dyestuff slurry is allowed to overflow from this reactor to a second stirred reactor in which it is continuously neutralised with aqueous sodium hydroxide liquor. The neutralised dyestuff slurry contains 2.8% colour and approximately 5.1% inorganic salts. Workup of the dyestuff slurry may be by conventional means i.e. filtration and washing free from salt or alternatively the slurry may be concentrated and washed by ultrafiltration.

EXAMPLE 3

In this Example the azo dyestuff is prepared by coupling diazotised 2,4-dinitroaniline with 5-acetylamino-2-methoxy-N,N-bis(2-methoxycarbonylethyl)aniline at pH 3.5 using a 20% sodium acetate solution to control neutralisation. The diazo component is soluble in concentrated sulphuric acid and is prepared by mixing a solution of the amine in 95% sulphuric acid with a solution of nitrosyl sulphuric acid in 100% sulphuric acid. The resultant diazo solution is stable at 20° C. and contains 0.942 g.mol of diazonium salt per kilo of solution. The coupling component is soluble in sulphuric acid/water and a solution is prepared containing 0.104 g.mol of coupling component per liter of 1.0% sulphuric acid/water.

The diazonium salt, coupling component and sodium acetate solutions are fed uniformly at rates of 6.05 g/min. 48.96 g/min. and 47.17 g/min. respectively into a reactor fitted with a high-shear immersion agitator (Ultra-Turrax mixer; Ultra-Turrax is a registered trade name), by means of pipes which terminate immediately below the rotor of the mixer. The mean residence time within the reactor is 13 seconds. The rotor has a diameter of 1.2 cm and is rotated at 10,000 rpm. The neutralised dyestuff slurry contains 2.7% colour and approximately 5% inorganic salts.

Work up of the dyestuff slurry may be by conventional means, i.e. filtration and washing free from salt or alternatively the slurry may be concentrated and washing by ultrafiltration.

EXAMPLE 4

A tubular reactor, as shown in the accompanying drawing, is used. In the drawing an L-shaped outer pipe 11, having an internal diamter of 4 mm has an entrance 13 and an exit 15. An inner pipe 17, having an internal diameter of 1 mm is sealed to the inner surface of the outer pipe 11 at a junction 19 downstream from the right angle bend 21 so as to form an annular space 23 between the two pipes 11, 17. A side arm 25 on the outer pipe 11 leads into the annular space 23 at the junction 19. The inner pipe and the outer pipe extend for 50 mm and 250 mm respectively in a downstream direction from the junction 19.

The feedstock solutions are the same as those used in Example 2. The diazonium salt solution is fed at a constant rate of 166 g./min. to the entrance 13 of the outer pipe 11 and thence to the inner pipe 17, and the coupling component solution is fed at a constant rate of 2310 ml/min. to the side arm 25 and thence into the annular space 23. From their initial point of contact the reactants flow a distance of 200 mm down the outer pipe and into a 1 meter length of 10 mm. diameter tubing, leading to a stirred tank reactor, wherein the resultant dyestuff slurry is neutralised with aqueous sodium hydroxide liquor. The neutralised slurry contains 2.8% dyestuff and approximately 5.1% of inorganic salts.

EXAMPLE 5

In this example the azo dyestuff is prepared by coupling diazotised 2,4-dinitroaniline with 5-acetylamino-2-methoxy-N,N-bis(2-methoxycarbonylethyl)aniline at pH 3.5 using a 20% w/w sodium acetate solution to effect neutralisation. The diazo component is soluble in concentrated sulphuric acid and is prepared by mixing a solution of the amine in 95% sulphuric acid with a solution of nitrosyl sulphuric acid in 100% sulphuric acid. The resultant diazo solution is stable at 20° C. and contains 0.942 g.mol. of diazonium salt per kilo of solution. The coupling component is soluble in sulphuric acid/water and a solution is prepared containing 0.104 g.mol. of coupling component per liter of 1.0% sulphuric acid/water.

The diazonium salt, coupling component and sodium acetate solutions are fed uniformly at rates of 6.05 g/min., 48.96 g/min. and 47.17 g/min. respectively into a reactor fitted with a Silverson immersion agitator, (Silverson is a registered trade name), by means of separate pipes which terminate immediately below the rotor of the mixer. The mean residence time within the reactor is 13 seconds. The rotor has a diameter of 1.2 cm. and is rotated at 10,000 rpm. The neutralised dyestuff slurry contains 2.7% colour and approximately 5% inorganic salts. Work up of the dyestuff slurry may be by conventional means, i.e. filtration and washing free from salt or alternatively the slurry may be concentrated and washed by ultrafiltration.

EXAMPLE 6

In this Example the azo dyestuff is prepared by coupling diazotised 2-bromo-6-chloro-4-nitroaniline with N,N-bis(2-methoxycarbonylethyl)aniline at pH 2.9–3.2 using 30% w/v sodium acetate solution to effect neutralisation. The diazo component is soluble in concentrated sulphuric acid and is prepared by mixing a solution of the amine in 96% sulphuric acid with a solution of nitrosyl sulphuric acid in 100% sulphuric acid. The resultant diazo solution is stable at 20° C. and contains 0.892 g.mol. of diazonium salt per kilo of solution. The coupling component is soluble in sulphuric acid/water and solution is prepared containing 0.333 g.mol. of coupling component per liter of 5% sulphuric acid/water.

The diazonium salt, coupling component and sodium acetate solutions are fed uniformly at rates of 12.23 g/min., 32.10 g/min. and 109.60 g./min. respectively into a tubular recirculation loop reactor by means of separate pipes which project into zones of turbulent mixing within the reactor. The reactor volume is one liter, and the mean residence time within the reactor is 7.3 minutes. The recirculation flow is approximately 4 liters/min. and is maintained by a Stuart-Turner centrifugal pump (Stuart-Turner is a registered trade name). Dyestuff slurry overflows from the reactor through a lute and contains 3.4% colour and approximately 5% inorganic salts. Isolation of the dyestuff may be by conventional means, i.e. filtration and washing free from salt or alternatively the slurry may be concentrated and washed by ultrafiltration.

We claim:

1. A process for the preparation of an aqueous slurry of a water-insoluble azo compound which comprises continuously mixing together, in a reaction zone from which the slurry is continuously removed, a first stream containing a diazonium compound resulting from the diazotisation of a heterocyclic or weakly basic benzenoid amine in a medium which contains at least 50%, by weight, of sulphuric acid, hereinafter referred to as the diazo component, and a second stream containing a compound capable of coupling with the diazo component under the conditions existing in the reaction zone to form a water-insoluble azo compound hereinafter referred to as the coupling component.

2. A process according to claim 1 wherein the acid medium comprises sulphuric acid.

3. A process according to claim 1 wherein the first stream is diluted with water immediately prior to mixing it with the second stream.

4. A process according to claim 3 wherein acid concentration in the first stream is reduced to within the range 2% to 15% by weight based on the weight of water and acid therein.

5. A process according to claim 3 wherein the dilution is effected within a period of from 1 sec. to 1 millisecond before the first stream is mixed with the second stream.

6. A process according to claim 1 performed in the presence of a surfactant.

7. A process according to claim 1 wherein the product stream is concentrated by a membrane separation process, after the coupling reaction is complete.

* * * * *